United States Patent [19]

Kogane et al.

[11] Patent Number: 4,742,375
[45] Date of Patent: May 3, 1988

[54] PRINTER PROCESSOR

[75] Inventors: Mikio Kogane; Kiichiro Sakamoto, both of Kanagawa, Japan

[73] Assignee: Fuji Photo Film Co., Ltd., Kanagawa, Japan

[21] Appl. No.: 13,279

[22] Filed: Feb. 10, 1987

[30] Foreign Application Priority Data

Feb. 10, 1986 [JP] Japan .................................. 61-25930
Feb. 10, 1986 [JP] Japan .................................. 61-25931

[51] Int. Cl.⁴ ...................... G03B 27/72; G03B 27/80
[52] U.S. Cl. ........................................ 355/20; 355/28
[58] Field of Search ...................... 355/20, 27, 28, 43; 354/75, 76

[56] References Cited

U.S. PATENT DOCUMENTS

3,111,887 11/1963 Alexander ....................... 354/76 X
4,067,650 1/1978 Spence-Bate ........................ 355/20
4,382,675 5/1983 Marshall ........................... 355/43 X Primary Examiner—Richard A. Wintercorn
Attorney, Agent, or Firm—Young & Thompson

[57] ABSTRACT

An apparatus for making a print in which a photographic image on a photographic original and a CRT image displayed on a CRT display device are selectively printed on a photographic paper and developed. The apparatus includes projection units each for projecting a photograph image or a CRT image on a photographic paper, an exposure control unit for holding a photographic paper in an exposure position and controlling exposure of the photographic paper, and a photograph development processing unit for developing an exposed photographic paper. The projection units are selectively used in accordance with an image to be exposed and optically coupled with the exposure control unit. In addition, the apparatus is useful for automatically making prints, in combination with a cutter for cutting a photograph print from a developed photographic paper into pieces, each comprising one frame and a punching cutter for punching out a photograph print into pieces each comprising one frame.

18 Claims, 6 Drawing Sheets

PRINTER PROCESSOR

BACKGROUND OF THE INVENTION

The present invention relates to a printer processor, and more particularly to an apparatus for printing a photographic image and a CRT image on a photographic paper.

Recently, a mini-laboratory type printer processor has been widely used which can easily make a print. The printer processor of this type has an exposure unit (printer) mounted facing a negative carrier and a photograph development processing unit (processor) mounted on one side of the exposure unit. A reversal film or a negative film set on the negative carrier is scanned and photometrically measured to automatically determine an exposure value. Upon operating the print key, the photographic image of a film is printed on a photographic paper which is then transported to the photograph development processing unit where it is developed. Finally, the photographic paper is cut into a frame and ejected.

A video printer processor for printing a CRT image on a photographic paper and producing a CRT image print has also been proposed, the CRT image including an image obtained using a TV camera, an image of characters inputted through a keyboard, a computer graphics image obtained using a digitizer for example, and an image obtained by electrically combining such images.

Conventional photograph printer processors and video printer processors have been manufactured as dedicated devices. Therefore, two printer processors are needed to produce both photographic prints and video prints, thus resulting in high cost, expensive maintenance, and requiring a large installation area.

OBJECTS OF THE INVENTION

It is an object of the present invention to provide a printer processor which can be used both as a photograph printer processor and as a video printer processor.

It is another object of the present invention to provide a printer processor which can be easily converted either into a photograph printer processor or into a video printer processor.

It is a further object of the present invention to provide a printer processor which uses a single pair of an exposure unit and a photograph development processing unit and can remarkably lower the processor cost and its cost of maintenance.

It is a still further object of the present invention to provide a printer processor which can cut or punch off a developed photographic paper into individual frames.

SUMMARY OF THE INVENTION

To achieve the above objects, the printer processor according to the present invention comprises a printer processor main frame equipped with an exposure unit and a photograph development processing unit, and a photographic image projection unit and a CRT image projection unit selectably mounted on the exposure unit. The projection units are selectably mounted on the printer processor main frame, facing a photographic paper loaded in the exposure unit, and print at least one of a CRT image and a photographic image on a photographic paper.

According to one aspect of the present invention, the projection units can print at least one of a CRT image and a photographic image on a photographic paper, by actuating optical path switching means either to displace a combined unit of two projection units, or to replace one of two discrete projection units with the other.

According to another aspect of the present invention, the photographic image projection unit having a light source and a negative carrier may be used for printing a photographic image on a photographic paper in combination with a cutter unit for cutting a developed photographic paper into individual frames, or the CRT image projection unit having a CRT may be used for printing a CRT image in combination with a punching unit for punching out a developed CRT image from the photographic paper and collecting the waste photographic paper.

BRIEF DESCRIPTION OF THE DRAWINGS

The above and other objects and features of the present invention will be more apparent upon consideration of the following description taken in connection with the accompanying drawings, in which.

DETAILED DESCRIPTION OF THE INVENTION

Preferred embodiments of the present invention will now be described with reference to the accompanying drawings. In the figures, elements designated by the same reference numerals represent identical or similar elements.

Figure 1:
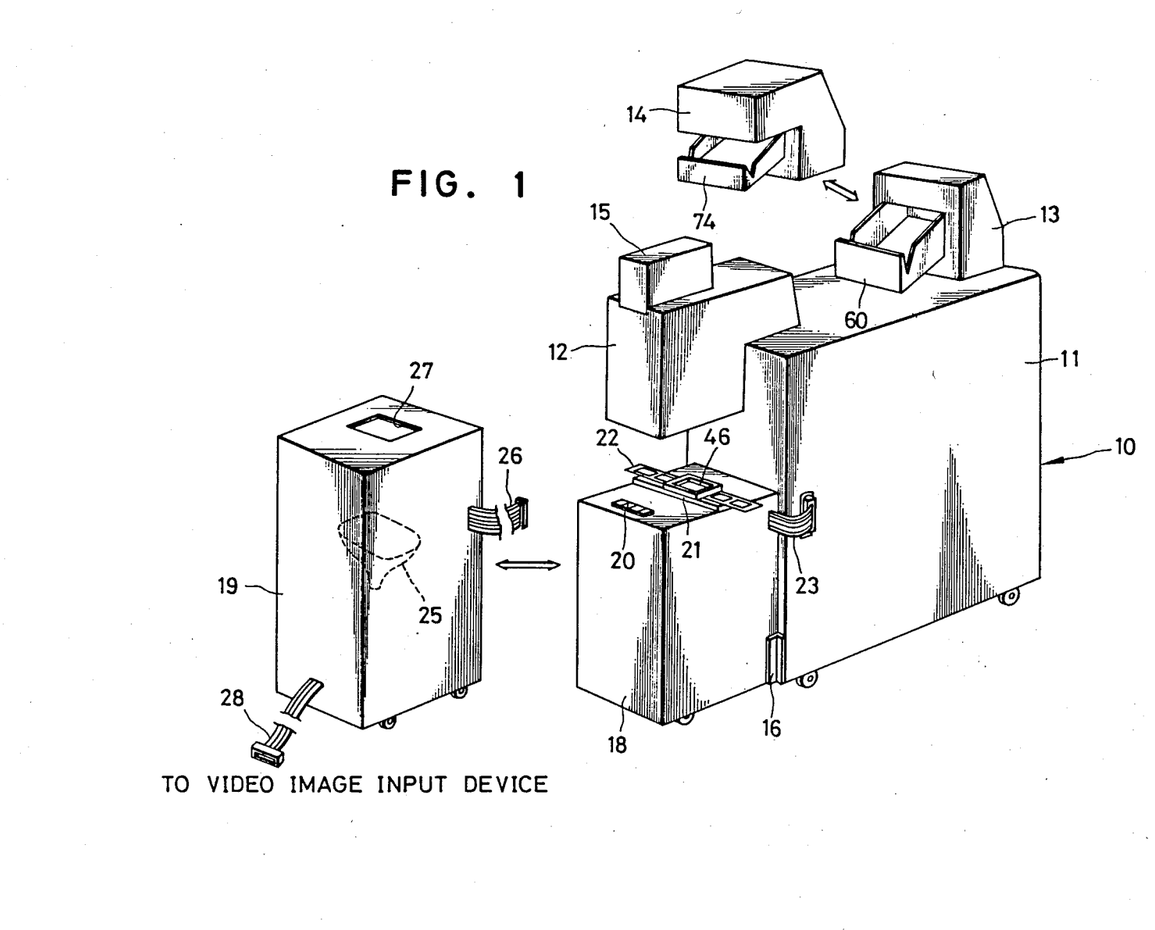
FIG. 1 is an exploded perspective view showing the construction of an embodiment of the present invention.

FIG. 1 diagrammatically shows the construction of a printer processor according to an embodiment of the present invention. A printer processor main frame 10 is comprised of a photograph development processing unit housing 11 and an exposure unit housing 12 mounted in the upper front of the photograph development processing unit housing. A photograph development processing unit (processor) for developing an exposed photographic color paper is housed within the photograph development processing unit housing 11. At the upper rear of the photograph development processing unit housing 11, a cutter unit 13 and a punching unit 14 are interchangeably mounted. The cutter unit 13 has a cutter for cutting a developed photographic color paper into individual frames, while the punching unit 14 is used for punching out a required portion of a developed photographic color paper. An exposure unit for exposing a photographic color paper is housed within the exposure unit housing 12 which detachably has, at its top, a magazine 15 accommodating an unexposed photographic color paper.

A photographic image projection unit 18 and a CRT image projection unit 19 are interchangeably mounted under the exposure housing 12 of the printer processor main frame 10. As a means for mounting each unit 18 or 19 on the printer processor main frame 10, closely confining pieces 16 between which the unit is fixedly mounted are provided. By fitting the unit 18 or 19 between the pieces 16, the optical projection axis is aligned with the center of the exposure unit within the exposure unit housing 12, e.g., with the optical axis of a printing lens 35.

At the top of the photograph image projection unit 18, a control key 20 such as a print key and a negative carrier 21 for loading a color original such as a color negative film 22, are provided. The printer processor becomes a photographic image printer processor by mounting the photographic image projection unit 18 under the exposure unit housing 12 and connecting its cord 23 to the printer processor main frame 10, thereby making it possible to print the photographic image of the color negative film 22 on a photographic color paper. Since the photographic image projection unit 18 is mounted some distance below the exposure unit housing 12, it is possible to load a color negative film 22 through the space between them and confirm the frame to be printed. A reversal film or a photographic print may be loaded in the negative carrier 21. In this case, a reversal photographic color paper is used, and a positive image is correspondingly displayed on the CRT.

Printer processors are generally used in a daylight room, with the result that the CRT screen is too brightly lighted to see to print a well-contrasted CRT image on a photographic color paper. In view of this, CRT 25 is housed within the CRT image projection unit 19 which is mounted on the printer processor main frame 10 with no gap between it and the exposure unit housing 12. A bellows (not shown) may be connected to the top of the CRT image projection unit 19 and guided on the exposure unit housing 12.

The printer processor becomes a video printer processor by mounting the CRT image projection unit 19 under the exposure unit housing 12 and connecting its cord 26 to the printer processor main frame 10, thus making it possible to print a CRT image of the CRT 25 on a photographic color paper via an aperture 27. The CRT image projection unit 19 is connected via a cord 28 to a video image input device (not shown) such as a TV camera, a video reproducing machine, or a computer graphics image generator. An image, character or combination thereof sent from the video image input device is displayed on the CRT 25. A negative image reversed by a positive/negative converter circuit is displayed on the CRT 25, whereas a positive image is displayed on a monitor of the video image input device.

Figure 2:
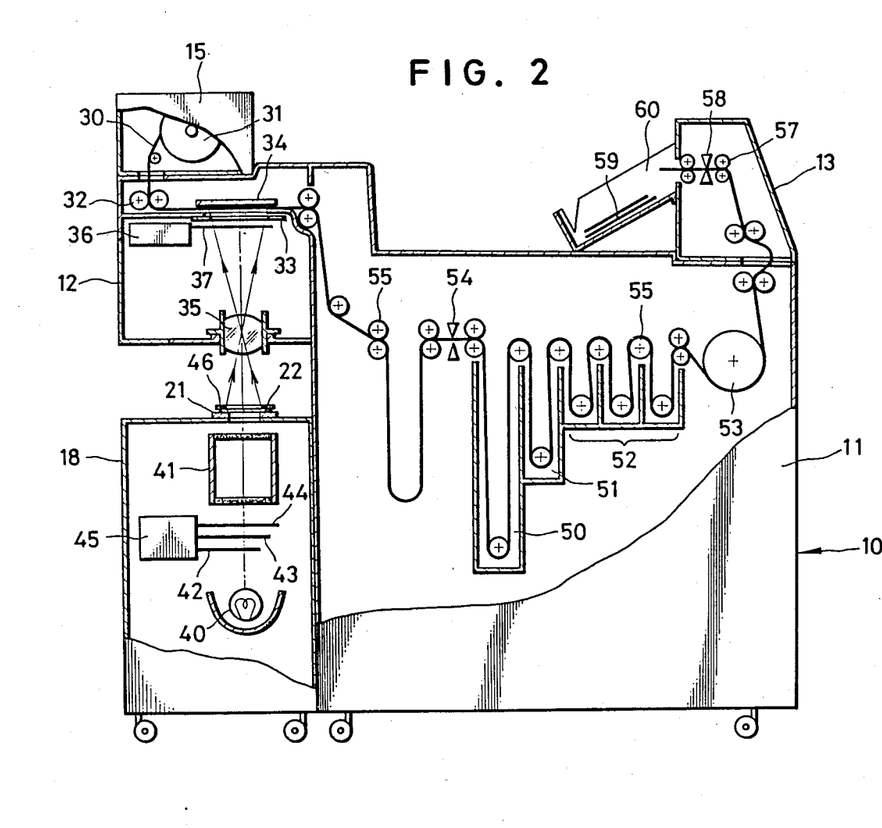
FIG. 2 is a sectional view showing the printer processor used as a photographic image printer processor, wherein the photographic image projection unit and the cutter unit are mounted on the printer processor main frame.

FIG. 2 shows the printer processor used as a photograph image printer processor in which the photographic image projection unit 18 and the cutter unit 13 are mounted on the printer processor main frame. A supply roll 31 of a photographic color paper 30 is detachably mounted within the magazine 15. The photographic color paper 30 is intermittently drawn by means of a pair of rollers 32 and introduced into the exposure unit housing 12 and moves to an exposure position between an easel mask 33 and a press plate 34.

A printing lens 35 and a shutter 37 which is controlled to be opened or closed by a shutter driving unit 36 are mounted in the exposure unit housing 12. The printing lens 35 is replaceable with one suitable for print magnification, and is removed when the CRT image projection unit 19 is used. A zoom lens may be used as the print lens 35. If the print lens 35 does not project from the exposure unit housing 12 so as to become an obstacle against mounting the CRT image projection unit 19, then it can be used also as a lens for printing a CRT image.

A white light source 40 is housed within the photographic image projection unit 18. White light emitted from the light source 40 passes via a mirror box 41 to the color negative film 22 held in place by a negative carrier 21 at the printing position to illuminate it from the underside. The mirror box 41, of a rectangular cross section, has a mirrored inside surface and diffusion plates covering both ends thereof through which the printing light passes. Disposed between the mirror box 41 and the white light source 40 are a cyan filter 42 regulating the red color components of the illuminating light, a magenta filter 43 for regulating the green color components, and a yellow filter 44 for regulating the blue color components. A filter control unit 45 controls the amount of insertion of the color filters 42 to 44 into the optical path, based on the light value measured by an image sensor (not shown) mounted near the print lens 35, and adjusts the amount of illuminating light to obtain a well-balanced color print having a proper density. The color negative film 22 is pressed down by the mask 46 which is activated by a solenoid (not shown) during printing.

Mounted within the photograph development processing unit housing 11 are a color development tank 50, a bleach-fix tank 51, a washing tank 52, a dryer drum 53 and a cutter 54. A plurality of rollers 55 are disposed at suitable positions for conveying a photographic color paper 30 through the above elements. An exposed photographic color paper 30 is subjected, within the photograph development processing unit housing 11, to color development, bleach-fix, washing and drying processes and thereafter, transported to the cutter unit 13.

Mounted within the cutter unit 13 are plural pairs of rollers 57 and a cutter 58 for cutting a developed photographic color paper 30 into individual frames. Prints 59 cut in units of one frame each are received by a tray 60.

Next, printing a photographic image will be described briefly. A power switch is turned on and a color negative film 22 is loaded in the negative carrier 21. The color filters 42 to 44 are initially in their normal positions so that the illuminating light from the white light source 40 remains standard. The filter control unit 45 automatically adjusts the amount to insert the color filters 42 to 44 into the optical path, based on the light value measured by the scanner. After this adjustment, the print key is operated to activate the white light source 40 to its maximum illumination and open the shutter 37 for a predetermined time. Thus, a negative image on the color negative film 22 is printed on a photographic color paper 30 through the printing lens 35. After printing a photograph image, the color filters 42 to 44 resume their ordinary positions and the white light source 40 is dimmed. Then, the exposed portion of the photographic color paper 30 is conveyed into the photograph development processing unit housing 11, while the unexposed portion thereof is pulled out from the magazine 15.

The above procedure is repetitively carried out and a plurality of negative images are printed on a photographic color paper 30. The exposed portion of the paper is temporarily stored in the form of loops inside the photograph development processing unit housing 11. After printing a predetermined number of negative images, the exposed portion in the form of loops starts to be conveyed toward the color development tank 50.

After conveying a predetermined number of frames, the cutter 54 is energized to cut the trailing end of the exposed portion. The exposed photographic color paper 30 thus cut into shorter lengths is transported by means of rollers 55 to the color development tank 50, bleach-fix tank 51, washing tank 52, and dryer drum 53 in this order to complete the development process and to reproduce positive images on the respective frames. The developed photographic color paper 30 is then transported to the cutter unit 13 wherein it is cut to the desired size and ejected to the tray 60.

Figure 3:
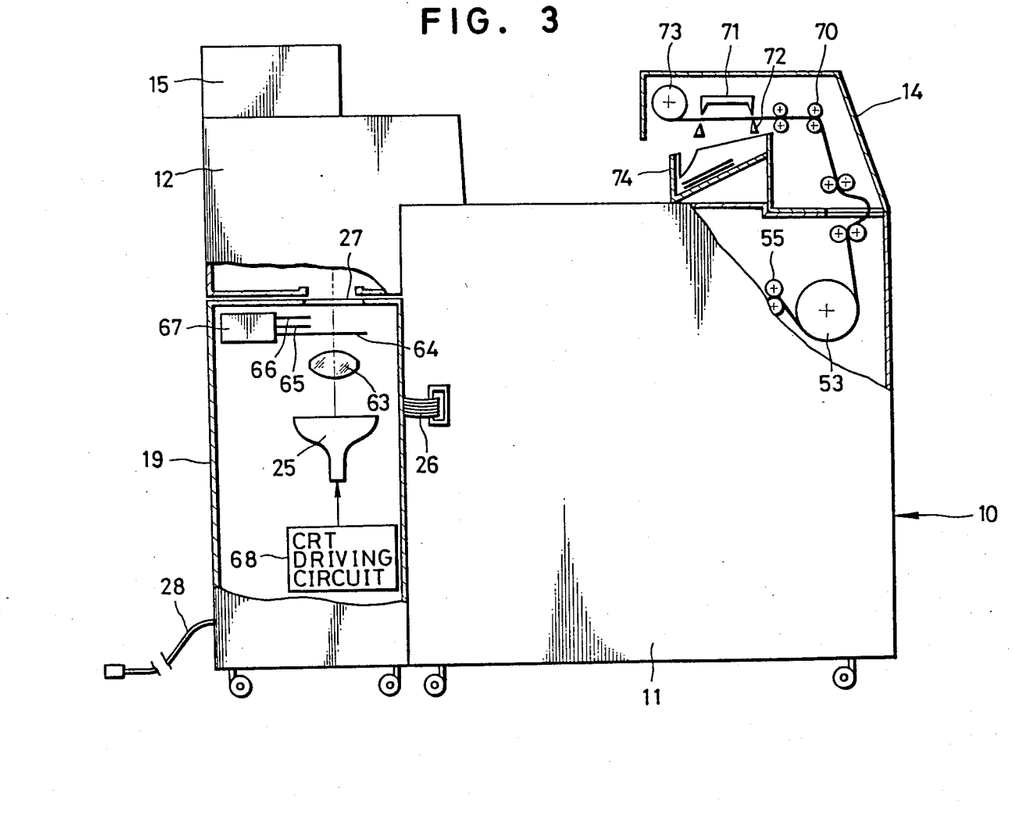
FIG. 3 is a side view, partially in section, showing the printer processor used as a video printer processor, wherein the CRT image projection unit and the punching unit are mounted on the printer processor main frame.

FIG. 3 shows the printer processor used as a video printer processor. In this mode, after the printing lens 35 is removed from the exposure unit housing 12, the CRT image projection unit 19 is mounted on the printer processor main frame 10, and the punching unit 14 is mounted on the photograph development processing unit housing 11. A color CRT may be used as the CRT 25, but to obtain a high quality of CRT image for printing purposes, a black-and-white monochrome CRT is used on which red, green and blue negative images are sequentially displayed as black-and-white images representing respective luminous densities, each for about 1 second. A high luminance CRT is used as the CRT 25 so as to cut the exposure time as short as possible, and a mixture of P45 and P22w is used as the fluorescence substance whose ratio is 1:3 to 1:5, or preferably 1:4. The CRT using such a fluorescence substance has high luminescence in red wavelengths and low in blue so that the exposure time for red color, to which photographic color paper 30 has a low spectral sensitivity, can be shortened to about 1 second. Similarly, the exposure time for blue color, to which photographic color paper 30 has a high spectral sensitivity, can be made substantially equal to that for red color, thus ensuring well-balanced color.

The CRT 25 displays white-and-black images representing luminous densities of red, green and blue images. To convert the white-and-black images into red, green and blue monochromatic images for printing, the red, green and blue filters 64, 65 and 66 disposed downstream of the printing lens 63 are selectively inserted into the optical path of the lens by means of the filter switching unit 67.

The punching unit 14 is comprised of a plurality of rollers 70, a movable punching blade 71, a fixed punching blade 72, a reel 73 for taking up waste photographic color paper, and a tray 74.

Next, the operation of the printer processor used as a video printer processor will be described. Characters, CG images and the like inputted from the video image input device are subjected to positive/negative conversion and thereafter supplied to the CRT 25 via a CRT driving circuit 68 to be displayed thereon. To print a CRT image, the CRT driving circuit 68 first picks up red color signals to display the white-and-black image corresponding to the luminous density of the red color image on the CRT 25. As the white-and-black image for the red color image is displayed, the red color filter 64 is inserted into the optical path of the lens 63 to convert the white-and-black image into a red color image. In this condition, the shutter 37 is opened for an exposure time determined based on the red color sensitivity of the photographic color paper 30, e.g., for about 1 second, to print the red color image on the photographic color paper 30.

After the exposure to the red color image, the shutter 37 is closed and the red color filter 64 is retracted, and in its place the green color filter 65 is inserted into the optical path. Simultaneously therewith, a white-and-black image for a green color image is displayed on the CRT 25. Then, the shutter 37 is again opened for a predetermined time, e.g., for about 1 second to print the green color image converted from the white-and-black image on the CRT 25 by the green filter 65, on the photographic color paper 30. Similarly, a blue color image is printed on the photographic color paper for about 1 second. After the CRT image has been printed on the photographic color paper 30 using such a three-color sequential exposure method, the color paper 30 is shifted by one frame to set an unexposed portion thereof at the exposure position.

As previously described, the photographic color paper 30 is cut with the cutter 54 after a predetermined number of frames have been exposed. The photographic color paper 30 is then developed to form positive images of respective frames and transported to the punching unit 14. To use the positive images as the photographs for license cards or identification cards, the punching unit 14 punches out the positive images from the developed photographic color paper 30 using the movable punching blade 71. The punched-out positive images are received in the tray 74, while the waste photographic color paper is wound about the reel 73.

Figure 4A:
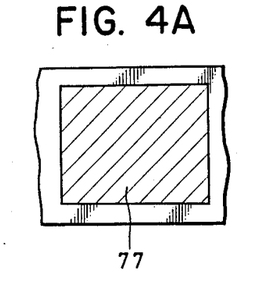
FIGS. 4(A) and 4(B) are plan views showing developed photographic color papers, respectively or horizontal and upright images.
Figure 4B:
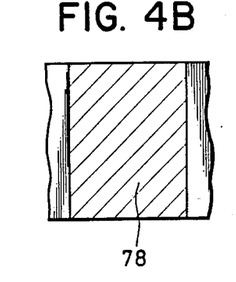

FIGS. 4(A) and 4(B) show how a crosswise image and a lengthwise image are punched out. The horizontal image indicated by 77 in FIG. 4(A) and the upright image indicated by 78 in FIG. 4(B), can be obtained by changing the installation direction of the photographic image projection unit 18 or the CRT image projection unit 19 relative to the printer processor main frame 10.

Figure 5:
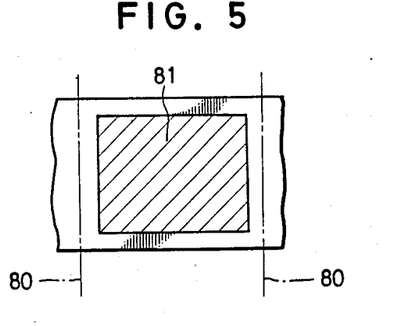
FIG. 5 is a plan view of a photographic color paper showing cutting positions for the cutter unit.

FIG. 5 shows how the cutter unit 13 cuts a photographic color paper, wherein each frame is cut and separated from the paper 30 at the sides of a developed positive image 81, as shown by one-dot chain lines 80.

Figure 6:
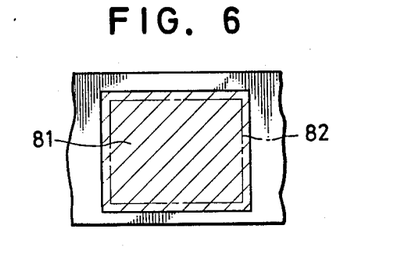
FIG. 6 is a plan view of a photographic color paper showing punching positions for the punching unit.

FIG. 6 shows how the punching unit 14 punches out a photographic color paper, wherein the unit 14 punches out the color paper within the developed positive image 81, as shown by a one-dot chain line 82.

In the above-described embodiment, although the video image input device is provided separately from the CRT image projection unit 19, the former device may be embodied in the latter unit 19. In the case of using a reversal photographic color paper, obviously a positive image is displayed on the CRT 25.

Figure 7:
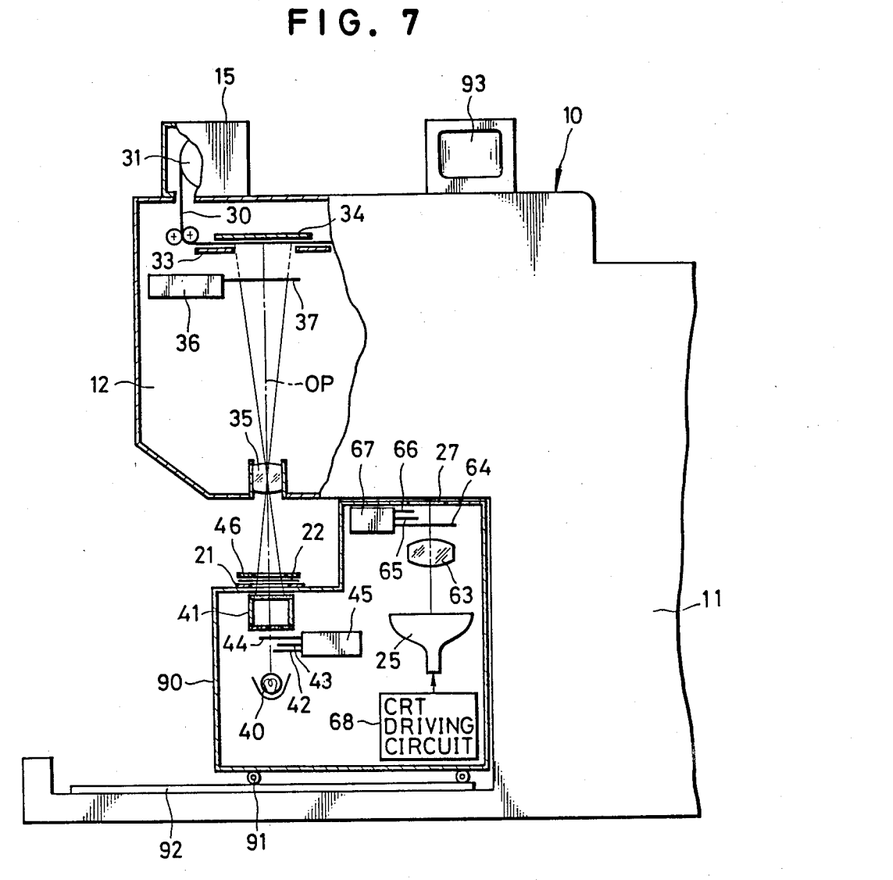
FIG. 7 is a diagrammatic view showing another embodiment of the present invention, wherein the photographic image projection unit and the CRT image projection unit are selectively used by sliding them within the main frame.

FIG. 7 is a diagrammatic view showing another embodiment of the printer processor according to the present invention. In this embodiment, the photographic image projection unit and the CRT image projection unit are assembled as a unit within a movable casing, so that at least one of the photographic image and the CRT image can be selectively printed on a photographic color paper. Elements having substantially the same function and operation as those of the embodiment shown in FIG. 2, are represented using identical reference numerals inrrespective of their installation positions, and the detailed description thereof is omitted. According to the embodiment shown in FIG. 7, there are mounted in a movable casing 90 constituting the projection unit, a negative carrier 21, a mask 46, a white light source 40 and filters 42 to 44 constituting the photographic image projection unit 28 of the first embodiment, and a CRT 25, its driving device 68, filters 64 to 66 and a printing lens 63 constituting the CRT image projection unit 19. The movable casing 90 with its casters 91 secured to the bottom thereof can be rolled in the direction perpendicular to the optical path OP along the rails 92 extending forwardly of the main frame 10. The movable casing 90 may be rolled in the direction perpendicular to the plane of FIG. 7, by mounting the photographic image projection unit and the CRT image projection unit side by side in that direction.

If the screen of the CRT 25 is exposed to ambient light, the screen becomes too bright and a CRT image of good contrast cannot be obtained. In view of this, the movable casing 90 is constructed to have a step between the portion where the negative carrier 21 is mounted and the portion in front of the CRT 25, thereby to guarantee clearance beneath the exposure housing 12. An opening 27 is formed in the casing wall in front of the CRT 25 to pass light from the CRT 25. Such a stepwise configuration of the movable casing 90 is not needed if a bellows is fixed thereto and extends to the bottom of the exposure housing 12.

With the arrangement shown in FIG. 7, the photographic image projection unit projects images onto a photographic color paper 30 so that the negative image on a color negative film 22 can be printed on the photographic color paper 30, in the manner described previously.

To print a CRT image on the photographic color paper 30, the movable casing 90 is moved forward to align the CRT 25 with the photographic color paper 30, thus enabling printing a CRT image as described previously. Since a CRT image is considerably larger than the negative image, a converted lens 63 is provided in front of the CRT 25. Instead of the converted lens 63, a dedicated lens of a CRT exposure optical system may be used with the print lens 35 removed when printing a CRT image.

The CRT driving circuit 68 is connected to a video image input device (not shown) and inputted with negative image video signals such as those of an image obtained using a color TV camera, a computer graphics image generated with a digitizer, or a character image inputted using a personal computer. Obviously, a positive image is displayed on the CRT 25 if a reversal photographic color paper is used. A monitor 93 is provided on the printer processor main frame 1 to monitor CRT images to be printed, on which monitor a positive image is displayed. The video image input device may be mounted on the printer processor main frame 1.

In this embodiment, it is important to correctly align the centers of the negative carrier 21 and the CRT 25 with the optical axis of the printing lens 35 after the movable casing 90 has been moved and stopped in position. To this end, a position determining stop may be provided along the path of the movable casing 90, or position determination may be effected using an image light measuring sensor (not shown) disposed near the printing lens 35. In the case of an image sensor, the correct position of an image is determined based on a difference in brightness of the image and a frame portion surrounding it, so that the optical axis can be adjusted by displacing the image portion to a predetermined position.

The operation of the printer processor of this embodiment when used as a photographic image printer processor or as a video image printer processor, is the same as in the first embodiment, so the description thereof is omitted.

Figure 8:
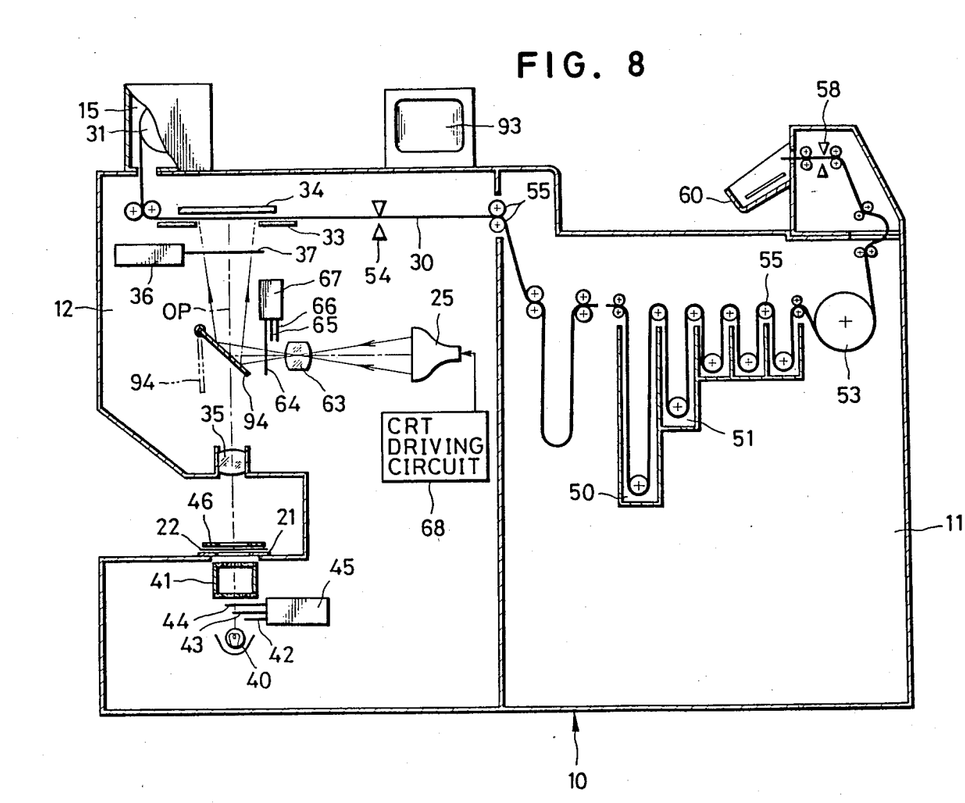
FIG. 8 is a diagrammatic view showing another embodiment of the present invention, wherein the photographic image projection unit and the CRT image projection unit are selectively used by changing the optical paths.

FIG. 8 is a diagrammatic view of a further embodiment of the printer processor according to the present invention. In this embodiment also, like elements are represented by the same reference numerals as before. Detachably mounted on the upper left of the printer processor main frame 10 shown in FIG. 8 is a magazine 15 in which a photographic color paper 30 wound in a roll is accommodated. The photographic color paper 30 is intermittently drawn by means of a pair of rollers and introduced into an exposure housing 12 and moved to an exposure position between an easel mask 33 and a press plate 34. A photographic image projection system and a CRT image projection system are mounted within the exposure housing 12.

A white light source 40 is disposed in a lower portion of the exposure housing 12. White light emitted from the light source 40 passes via a mirror box 41 to a color original such as a color negative film 22 held in place by a negative carrier 21 in the printing position to illuminate it from the underside. The mirror box 41, of a rectangular cross section, has a mirrored inside surface and diffusion plates covering both ends thereof through which the printing light passes. Disposed between the mirror box 41 and the white light source 40 are a cyan filter 42 regulating the red color components of the illuminating light, a magenta filter 43 for regulating the green color components, and a yellow filter 44 for regulating the blue color components. A filter control unit 45 controls the amount of insertion of the color filters 42 to 44 into the optical path, and adjusts the amount of illuminating light in accordance with a negative image of the color negative film 22 which is pressed down by the mask 46 activated by a solenoid (not shown) during printing. In the case of printing a positive image of a reversal film or a photographic print, a reversal photographic color paper is used and a positive image is displayed on the CRT. In the case of a photographic print, it is illuminated from the upper side thereof.

The exposure housing 12 is configured to have a recessed portion between the negative carrier 21 and the printing lens 35 so as to facilitate loading a color negative film 22 into the negative carrier 21 or to confirm the frame position. A mirror 94 is mounted above the printing lens 35, which mirror is retracted from the optical path OP by a solenoid or other means during the printing of a photographic image. Using the printing lens 35, a photographic image is printed on a photographic color paper 30 while the shutter 37 is open. The shutter 37 is opened or closed by a shutter control unit 36. The shutter is opened once, for a time corresponding to the photographic paper sensitivity, to print a photographic image using the photographic image projection system; whereas it is opened three times, once for each color, to print a CRT image using the CRT image projection system. The reason is that a white-and-black CRT is used in the CRT image projection system to enhance the resolution. Therefore, if a color CRT is used, a CRT image can be printed on a photographic color paper 30 by a single exposure operation. The present invention is also applicable to the case wherein a white-and-black image is printed on a white-and-black photographic paper.

The photographic image projection system can produce a high quality image so that it is preferable not to mount a mirror or the like in the optical path. On the contrary, the CRT image projection system cannot produce a high quality image so that an exposure through a mirror does not greatly affect the image quality. In view of this, in this embodiment, the mirror 94 is disposed in front of a white-and-black CRT 25 (hereinafter simply called CRT) constituting the CRT image projection system. During printing, the CRT 25, under control of a CRT driving circuit 68, sequentially displays red, green and blue negative images in the form of white-and-black images representing respective luminous densities, each for about 1 second. To cut the exposure time as short as possible, a high-luminance CRT is used as the CRT 25, a fluorescent substance being used which is a mixture of P45 and P22 whose ratio is 1:3 to 1:5, or preferably 1:4.

The CRT 25 displays white-and-black images representing the luminous densities of red, green and blue images. To convert the white-and-black images into red, green and blue monochromatic images for printing, the red, green and blue filters 64, 65 and 66 disposed between the printing lens 63 and the mirror 94 are selectively inserted into the optical path of the lens by means of the filter switching unit 67.

As in the first embodiment, a similar development processing housing 11 is provided at the right of the printer processor main frame 10. An exposed photographic color paper 30 is cut to a predetermined length to be developed and thereafter, it is cut with a cutter 13 into pieces containing one frame each, to be ejected onto a tray 60.

Next, the operation of the above embodiment will be described. First, the operation of the printer processor used as a photographic image printer processor will be described. A power switch is turned on and a color negative film 22 is loaded in the negative carrier 21. The color filters 42 to 44 are initially in their normal positions so that the illuminating light from the white light source 40 remains standard. The filter control unit 45 automatically adjusts the amount to insert the color filters 42 to 44 into the optical path OP, based on the light value measured by the scanner. After this adjustment, the print key is operated to activate the white light source 40 to its maximum illumination and open the shutter 37 for a predetermined time. Thus, a negative image on the color negative film 22 is printed on a photographic color paper 30 through the printing lens 35. After printing a photograph image, the color filters 42 to 44 resume their ordinary positions and the white light source 40 is dimmed. Then, the exposed portion of the photographic color paper 30 is conveyed into the development housing 11, while the unexposed portion thereof is pulled out of the magazine 15.

The above procedure is repetitively carried out and a plurality of negative images are printed on a photographic color paper 30. The exposed portion of the paper is temporarily stored in the form of loops inside the development housing 11. After printing a predetermined number of negative images, the exposed portion of the form of loops starts to be conveyed toward the color development tank 50.

After conveying a predetermined number of frames, the cutter 54 is energized to cut the trailing end of the exposed portion. The exposed photographic color paper 30 thus cut into shorter lengths is transported by means of rollers 55 to the color development tank 50, bleach-fix tank 51, washing tank 52, and dryer drum 53 in this order to complete the development process and to reproduce positive images on the respective frames. The developed photographic color paper 30 is then cut by the cutter 58 into pieces each comprising one frame, which are then ejected to the tray 60.

In the case of using the printer processor as a video printer processor, the CRT 25 is activated and the mirror 94 in the retracted position is rotated by 45° to insert it into the optical path OP. Video signals from the video image input device are inputted to the CRT driving circuit 68 to display a negative image on the CRT 25. The image displayed on the CRT 25 can be monitored on a monitor CRT 93 which displays a corresponding positive image. For this, the white light source 40 will of course be turned off.

Upon operation of the print key, the CRT driving circuit 68 makes the CRT 25 display an image whose luminous intensity corresponds to that of a red color image. As the red color image in the form of a white-and-black image is displayed on the CRT 25, the red color filter 64 is inserted into the optical path of the print lens 63 to convert the white-and-black image on the CRT 25 into a red color image. In this condition, the shutter 37 is opened for an exposure tie determined based on the red color sensitivity of the photographic color paper 30, e.g., for about 1 second, to print the red color image on the photographic color paper 30.

After exposure to the red color image, the shutter 37 is closed and the red color filter 64 is retracted, and in its place the green color filter 65 is inserted into the optical path. Simultaneously therewith, a white-and-black image for a green color image is displayed on the CRT 25. Then, the shutter 37 is again opened for a determined time, e.g. for about 1 second to print the green color image converted from the white-and-black image on the CRT 25 by the green filter 65, on the photographic color paper 30. Similarly, a blue color image is printed on the photographic color paper for about 1 second. After the CRT image has been printed on the photographic color paper 30 using such a three-color sequential exposure method, the color paper 30 is shifted by one frame to set an unexposed portion thereof at the exposure position.

As previously described, the exposed photographic color paper 30 is transported to the development housing 11 to be developed and thereafter cut into pieces each comprising one frame, to be ejected onto the tray 60.

In this embodiment, it is possible to print both a photographic image and a CRT image on the same frame of a photographic color paper 30. With this dual exposure, a print having a composite image of both a photographic image and a CRT image is readily available.

Although the present invention has been fully described by way of the preferred embodiments thereof with reference to the accompanying drawings, various changes and modifications will be apparent to those skilled in the art. Therefore, unless otherwise such changes and modifications depart from the true scope of the present invention, they should be construed as being included therein.

What is claimed is:

1. A printer processor wherein a photographic paper in an exposure station is exposed and transported to a photographic development processing unit to be developed, comprising:
    a main frame having an exposure station and a photographic development processing unit;
    a photographic image projection system for projecting a photographic image recorded on a photographic original onto said photographic paper;
    a CRT image projection system having a CRT for projecting a CRT image displayed on said CRT onto said photographic paper;
    means for selectively optically aligning either one of said photographic image projection system and said CRT image projection system with said exposure station thereby to print one of said photographic image and said CRT image;
    a cutter unit for cutting a developed photographic paper into pieces each containing one frame; and
    a punching unit for punching out a developed CRT image from said photographic paper and for collecting punched-out waste photographic paper;
    wherein both said cutter unit and said punching unit are selectably and detachably mounted on said printer processor main frame.

2. A printer processor according to claim 1, wherein said photographic image projection system and said CRT image projection system are selectively attachable to said main frame of said printer processor.

3. A printer processor according to claim 1, wherein said photographic image projection system and said CRT photograph image projection system are mounted within said main frame of said printer processor.

4. A printer processor according to claim 1, wherein said optical alignment means is a mirror by which one of said phtograph image and said CRT image is projected onto said exposure station.

5. A printer processor according to claim 1, wherein said optical alignment means is a means which can move slidably within the frame of said printer processor, on which means said photograph image projection system and said CRT image projection system are juxtaposed.

6. A printer processor for exposing and developing a photographic paper comprising:
    a printer processor main frame having exposure means for holding said photographic paper in an exposure position and exposing said paper and with photographic development processing means for developing said exposed photographic paper;
    a first housing having mounted therein a photographic image projection unit, said first housing being detachably mounted on said printer processor main frame in alignment with said photographic paper in said exposure position, said photographic image projection unit comprising a light source and photographic original support means, for projecting a photographic image on said photographic paper; and
    a second housing having mounted therein a CRT image projection unit, said second housing being detachably mountable in place of said first housing on said printer processor main frame in alignment with said photographic paper in said exposure position, said CRT image projection unit comprising a CRT display device, for projecting an image displayed on said CRT display device on said photographic paper;
    whereby at least one of said photographic image and said CRT image is printed on said photographic paper.

7. A printer processor according to claim 6, wherein said first housing is a box-like projection unit having a projection aperture, and said second housing is another box-like projection unit having a projection aperture.

8. A printer processor according to claim 6, wherein said CRT projection unit is adapted, when mounted on said printer processor main frame via said second housing to project either one of a horizontal image and an upright image on said photographic paper.

9. A printer processor according to claim 7, wherein said photographic original support means is a negative carrier mounted on said projection aperture formed in first housing.

10. A printer processor according to claim 6 further comprising:
    a cutter unit for cutting a developed photographic paper into pieces each comprising a single frame; and
    a punching unit for punching out a developed CRT image from said photographic paper and collecting waste photographic paper from which said images have been punched out;
    wherein both said cutter unit and said punching unit are selectively and detachably mountable on said printer processor main frame.

11. A printer processor for exposing and developing a photographic paper, comprising:
    a main frame having exposure control means for controlling an exposure of said photographic paper;
    photograph image projection means having photographic original support means for projecting a photographic image on said photographic paper;
    CRT image projection means having a CRT display device and juxtaposed with said photographic image projection means for projecting an image displayed on said CRT display device on said photographic paper; and
    means for effecting a relative movement between said respective projection means and said exposure control means for optically aligning either selected one of said projection means with said exposure control means, comprising a housing in which said respective projection means are mounted, said housing being movable relative to said exposure control means of said main frame;
    whereby at least one of said photographic image and said CRT image is printed on said photographic paper.

12. A printer processor according to claim 11, wherein said photographic image projection means and said CRT image projection means are unitary and are juxtaposed within said housing, said housing being slidable with respect to said printer processor main frame.

13. A printer processor according to claim 11 further comprising:
    a cutter unit for cutting a developed photographic paper into pieces each comprising one frame; and
    a punching unit for punching out a developed CRT image from said photographic paper and collecting punched-out waste photographic paper;

wherein said cutter unit and said punching unit are selectably and detachably mounted on said printer processor main frame.

14. A printer processor for exposing and developing a photographic paper comprising a printer processor main frame comprising:
- a photographic image exposure system for projecting an image of a photographic original onto said photographic paper;
- a CRT image exposure system for projecting an image displayed on a CRT display device onto said photographic paper;
- exposure system switching means for selectively projecting said photograph image and said CRT image to said photographic paper; and
- photograph development processing means for developing an exposed photographic paper;
- whereby at least one of said photographic image and said CRT image is printed on said photographic paper;

said printer processor further comprising:
- a cutter unit for cutting a developed photographic paper into pieces each containing one frame; and
- a punching unit for punching out a developed CRT image from said photographic paper and for collecting punched-out waste photographic paper;
- wherein both said cutter unit and said punching unit are selectably and detachably mounted on said printer processor main frame.

15. A printer processor according to claim 14, wherein said photographic image exposure system and said CRT image exposure system share part of an exposure optical path.

16. A printer processor according to claim 14, wherein at least one of said exposure systems is disposed in alignment with said photographic paper.

17. A printer processor according to claim 14, wherein said exposure system switching means is a mirror mounted in the optical path of at least one of said exposure systems.

18. A printer processor wherein a photographic paper in an exposure station is exposed and transported to a photographic development processing unit to be developed, comprising:
- a photographic image projection system for projecting a photographic image recorded on a photographic original onto said photographic paper;
- a CRT image projection system having a CRT for projecting a CRT image displayed on said CRT onto said photographic paper;
- means for selectively optically aligning either one of said photographic image projection system and said CRT image projection system with said exposure station thereby to print one of said photographic image and said CRT image; and
- a punching unit for punching out a developed image from said photographic paper and for collecting punched-out waste photographic paper.

* * * * *